C. L. Alexander & V. A. Osborn.
Book Cover Protector.

No. 2886. Reissued Mar. 3. 1868.

Witnesses:
Jas. H. Folsom.
L. C. Rau.

Inventor:
Charles L. Alexander.
Victor A. Osborn

N. PETERS, PHOTO-LITHOGRAPHER, WASHINGTON, D. C.

UNITED STATES PATENT OFFICE.

CHARLES L. ALEXANDER AND VICTORIA A. OSBORN, OF WASHINGTON, D. C.

IMPROVEMENT IN BOOK-COVER PROTECTORS.

Specification forming part of Letters Patent No. 69,062, dated September 24, 1867; Reissue No. 2,886, dated March 3, 1868.

*To all whom it may concern:*

Be it known that we, CHARLES L. ALEXANDER and VICTORIA A. OSBORN, of Washington city, in the county of Washington and District of Columbia, have invented a new and useful Improvement in Book-Cover Protectors; and we do hereby declare that the following is a full and exact description thereof, reference being had to the accompanying drawings, forming a part of this specification, in which—

Figure 2:
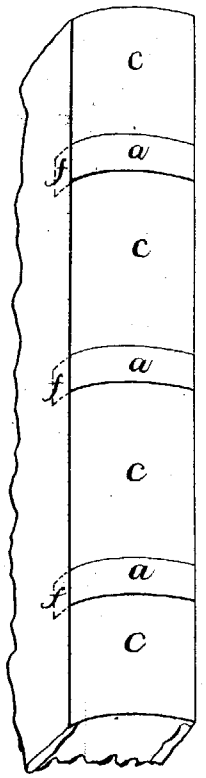
Figure 1:
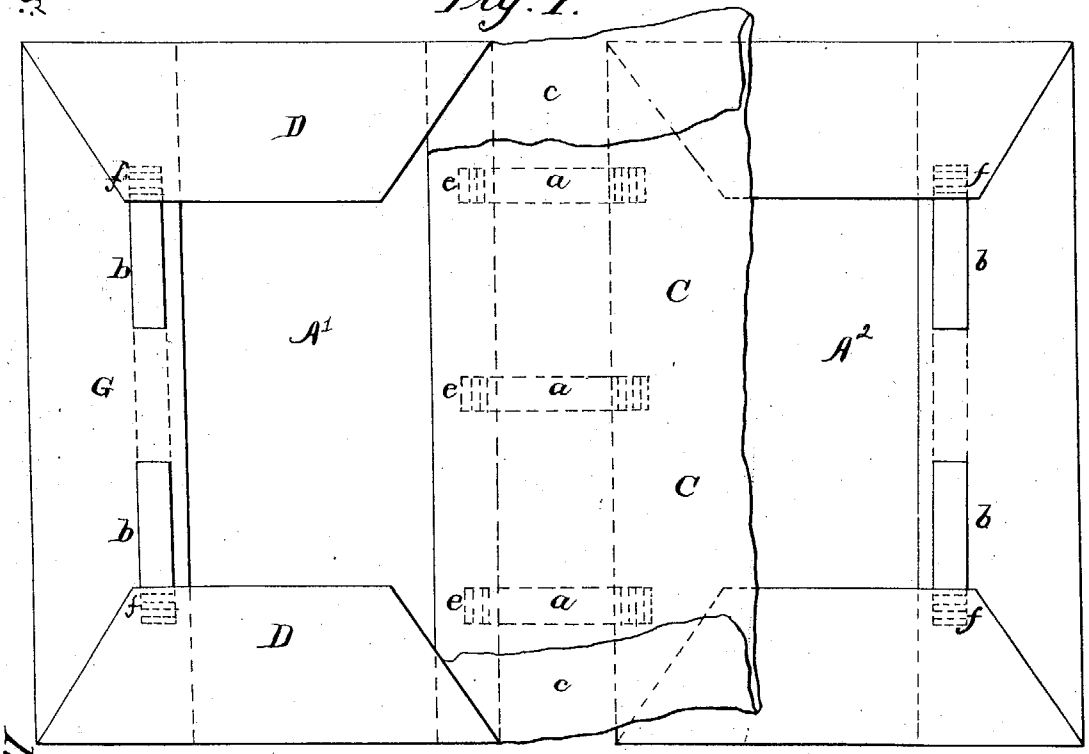

Figure 1 is a view of the cover-protector open previous to use; Fig. 2, a view of the back of said protector when on a book.

The present invention consists in rendering the book-cover protector expansible, so that it may be put on and taken off at pleasure and adapt itself to books of various thicknesses and of several sizes. It can be made of linen, india-rubber, leather, or other material of sufficient durability, strength, and elasticity.

The cover-protector (see Fig. 1) is in two parts, A′ and $A^2$, connected together by india-rubber or elastic bands *a a a*, and having a center piece or flap, C C, attached at *e e e* to the part A′, or forming a part and being an extension of said part; also, the india-rubber or elastic bands *b b b b*, fastened at the points *f f f f*, hold firmly the upper and lower folded portions of the cover D D, and may pass through part of the end folds, G G, thus allowing of an adaptation of the same cover by new folds to books of various sizes. These india-rubber or elastic bands may be attached by sewing or by means of clasps or eyelets. The center piece or flap, C C, whether a part of A′ or detached, will also accommodate itself easily, by means of the upper and lower extended folded portions, *c c*, to similar requirements; but should the part A′ be extended so as to replace the center piece or flap, C C, then said part may be attached to $A^2$ by an elastic band or bands to a point or points underneath the folded portion G, in which case, in adjusting the cover-protector to a book, the folded upper and lower parts, D D, would have to be cut at the points desired to fit the book.

It is obvious that in accordance with the plan of the invention the elastic bands or straps described in each of the several situations may be widened so as to fill the whole space, though this is not regarded either as an economical or desirable mode of constructing the cover. In order to adjust the back to correspond in length with the sides, when applied to a larger volume than the original fold is adapted to, an ivory folder or the back of a large knife may be applied to form the new fold desired.

We are aware that a book-cover protector, the overlapping back edges of which have been heretofore joined together by paste or mucilage, or by sewing with ordinary thread, has already been patented. We do not therefore claim such a device; nor do we claim a cover-protector of a continuous piece, that being also an old device; but

We claim as an improvement in detachable book-cover protectors—

1. The elastic or extensible bands or straps *b b b b*, connecting the top and bottom folds, D D D D, by means of clasps or other devices, and thus applicable to various sizes of book-cover in such manner as to render it extensible.

2. The elastic bands or straps *a a a a*, to form an expansible connection for the two halves of the book-cover protector, substantially as described.

3. Such a book-cover protector or mode of covering books as, by reason of its expansibility and extensibility, may be adjusted to books of various sizes, substantially as described.

CHARLES L. ALEXANDER.
VICTORIA A. OSBORN.

Witnesses:
PARIS H. FOLSOM,
F. C. RAU.